(12) United States Patent
Georges et al.

(10) Patent No.: US 10,909,972 B2
(45) Date of Patent: Feb. 2, 2021

(54) SPOKEN LANGUAGE UNDERSTANDING USING DYNAMIC VOCABULARY

(71) Applicant: INTEL CORPORATION, Santa Clara, CA (US)

(72) Inventors: Munir Nikolai Alexander Georges, Kehl (DE); Grzegorz Wojdyga, Gdańsk (PL); Tomasz Noczynski, Gdansk (PL); Jakub Nowicki, Braniewo (PL); Szymon Jessa, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 15/805,452

(22) Filed: Nov. 7, 2017

(65) Prior Publication Data

US 2019/0027133 A1    Jan. 24, 2019

(51) Int. Cl.

| | |
|---|---|
| *G10L 15/22* | (2006.01) |
| *G10L 15/16* | (2006.01) |
| *G10L 15/19* | (2013.01) |
| *G06F 40/20* | (2020.01) |
| *G10L 15/18* | (2013.01) |
| *G10L 15/06* | (2013.01) |
| *G10L 15/193* | (2013.01) |

(52) U.S. Cl.
CPC .......... *G10L 15/1815* (2013.01); *G06F 40/20* (2020.01); *G10L 15/063* (2013.01); *G10L 15/16* (2013.01); *G10L 15/1822* (2013.01); *G10L 15/19* (2013.01); *G10L 15/193* (2013.01); *G10L 15/22* (2013.01); *G10L 2015/0635* (2013.01); *G10L 2015/223* (2013.01)

(58) Field of Classification Search
CPC ............... G10L 15/1815; G10L 15/063; G10L 15/1822; G06F 17/27
USPC ........................................... 704/232
See application file for complete search history.

(56) References Cited

U.S. PATENT DOCUMENTS

| | | | |
|---|---|---|---|
| 2004/0148170 A1* | 7/2004 | Acero | G06F 40/216 704/257 |
| 2014/0280072 A1* | 9/2014 | Coleman | G06F 16/248 707/722 |
| 2014/0288932 A1* | 9/2014 | Yeracaris | G10L 15/30 704/249 |
| 2015/0221300 A1* | 8/2015 | Sukhomlinov | G10L 15/08 704/246 |
| 2016/0379629 A1* | 12/2016 | Hofer | G06F 40/289 704/257 |
| 2018/0151177 A1* | 5/2018 | Gemmeke | G10L 15/065 |

* cited by examiner

*Primary Examiner* — Richemond Dorvil
*Assistant Examiner* — Rodrigo A Chavez
(74) *Attorney, Agent, or Firm* — Hanley, Flight and Zimmerman, LLC

(57) ABSTRACT

An example apparatus for detecting intent in voiced audio includes a receiver to receive one or more word sequence hypotheses related to a voiced audio and a dynamic vocabulary. The apparatus also includes a natural language understander (NLU) to detect an intent and recognize a property related to the intent based on the word sequence hypothesis and the dynamic vocabulary. The apparatus further includes a transmitter to transmit the detected intent and recognized associated property to an application.

22 Claims, 10 Drawing Sheets

SPOKEN LANGUAGE UNDERSTANDING USING DYNAMIC VOCABULARY

BACKGROUND

Spoken language understanding (SLU) is a field in between the areas of speech processing and natural language processing. For example, a spoken phrase may be processed using speech processing to translate the spoken speech into a machine readable format. In some examples, a natural language understanding (NLU) apparatus may then perform machine reading comprehension on the output of the speech processing in order to determine an intent of the spoken phrase and cause one or more actions to be performed in response to the spoken phrase.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
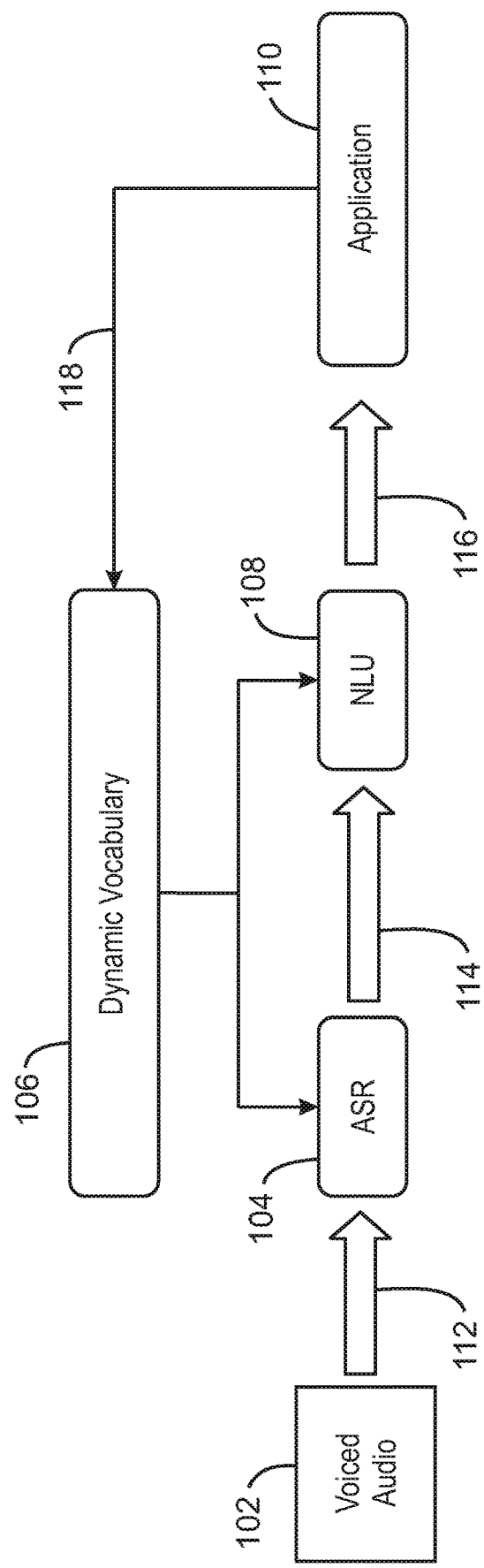
FIG. 1 is a block diagram illustrating an example system for detecting intent in voiced audio using a dynamic vocabulary.

As discussed above, SLU systems can be used to control applications using spoken language. For example, an SLU system can be used in a voice-controlled music playing application. In some examples, a vocabulary can be used to train a spoken language understanding system to detect intent and properties to perform one or more actions. However, a bounded vocabulary may not work with some entities to be detected that may frequently and spontaneously change over time. For example, such entities may include favorite music titles, brand names, drugs, etc., that may be included in news, social media, streaming media stars and songs, among other sources. Moreover, performing an entire model estimation with updated training data to include such changing entities may be computationally expensive and may require access to training data. Thus, updating the system using training data may not be possible for run-time systems in embedded devices. In addition, the estimation process may take a long time, which may cause delayed availability of the updated vocabulary and thus negatively impact user experience.

The present disclosure relates generally to techniques for spoken language understanding. Specifically, the techniques described herein include an apparatus, method and system for detecting intent in voiced audio using a dynamic vocabulary. As used herein, dynamic vocabulary refers to a vocabulary that is generated or modified at run time. The dynamic vocabulary may include a list of parameters that can be used to detect dynamic vocabulary phrases rather than a list of words. An example apparatus includes a receiver to receive a word sequence hypothesis related to a voiced audio and a dynamic vocabulary. The apparatus includes a natural language understander (NLU) to detect an intent and recognize a property related to the intent based on the word sequence hypothesis and the dynamic vocabulary. The apparatus further includes a transmitter to transmit the detected intent and recognized associated property to an application. In some examples, the apparatus also includes a feature front-end to generate a bag of features based on the word sequence hypotheses and the dynamic vocabulary. For example, the NLU is to detect the intent and the property based on the bag of features.

The techniques described herein thus take advantage of the dynamic vocabulary feature of automatic speech recognizers for natural language understanding. The techniques described herein thereby enable a dynamically changing vocabulary for spoken language understanding systems, such as voice dialog systems and voice chat bots. Moreover, the techniques may provide customizable and user adaptive SLU engines for embedded devices such as robots, car head-units, or home appliances. In addition, the techniques described herein may enable an enhanced user experience with increased accuracy and personalization capabilities. For example, new artists, songs, or other dynamically changing named entities may be more accurately recognized and played back on command. In addition, the techniques described may enable less maintenance and service costs due to self-adaptation of the dynamic vocabulary with one or more applications.

FIG. 1 is a block diagram illustrating an example system for detecting intent in voiced audio using a dynamic vocabulary. The example system is referred to generally by the reference number 100 and can be implemented in the computing device 900 below in FIG. 9 using the processes 400 and 500, or method 700 of FIGS. 4, 5, and 7 below.

The example system 100 includes a voice audio 102 that is received at an automatic speech recognizer (ASR) 104. The ASR may also be coupled to a server to have access to a dynamic vocabulary 106. For example, the dynamic vocabulary may include a set of relations between word sequences and semantic classes. The dynamic vocabulary may also include a list of parameters. The dynamic vocabulary may be stored on the server. The system 100 further includes a natural language understander (NLU) 108. The NLU 108 may also be coupled to the server to have access to the dynamic vocabulary 106. The system 100 further includes an application that is communicatively coupled to the NLU 108 and the dynamic vocabulary 106.

As shown in FIG. 1, a voiced audio 102 may be received by the ASR 104 as indicated by an arrow 112. For example, the voiced audio 102 may be speech that may have been captured by one or more microphones of a natural language understanding system 100. The ASR 104 may then generate one or more word sequence hypotheses based on the dynamic vocabulary 106 and the voice audio 102, as described in greater detail with respect to FIG. 2 below. For example, the word sequence hypotheses may include sets of word sequences corresponding to the voiced audio 102. The dynamic vocabulary 106 may compute a common representation of a dynamic and changing vocabulary. In some examples, the dynamic vocabulary 106 may be a set of word sequences with semantic interpretations given as a table. The word sequence hypotheses may be sent to the NLU 108 as indicated by an arrow 114. The NLU 108 may then semantically analyze the word sequence hypotheses using the dynamic vocabulary 106, as described in greater detail with respect to FIGS. 2-4 below. The NLU 108 may then generate one or more normalized commands based on the word sequence hypotheses and the dynamic vocabulary 106 and send the normalized commands to the application 110 as indicated by an arrow 116. For example, the normalized commands may include an intent and a property. In some examples, an intent may be desired a course of action, while the property may modify the intent.

For example, the application 110 may be a music player that maintains a list of favorite music titles for a user. In one example, a normalized command from the NLU 108 may be to play a song for a voice query. For example, a word sequence hypothesis may be "I want to listen to a song by Bruce Springfield." In some examples, the NLU may generate the normalized command "Play a song from Bruce Springfield," where the artist name "Bruce Springfield" is part of the dynamic vocabulary, and send the normalized command to the application 110. In this example, the intent may be "Music, Play Song" and the property may be "Artist=Bruce Springfield." In some examples, the dynamic vocabulary 106 may receive a table from the application 110 as indicated by an arrow 118. For example, the music player application may capture information from a user configuration or a user profile. In some examples, the dynamic vocabulary 106 can also be extracted from a calendar or address book. For example, the dynamic vocabulary 106 may be extracted by application 110. In some examples, information for the dynamic vocabulary may be extracted, for example, from an inserted CD that is detected by a music application 110. For example, the information may be provided in a table in the form: [<Intent>, <Property>, <weight>, <literal sequence>, <canonical>]. For example, the <Intent> column may refer to an intent associated with one or more words. The <Property> column may refer to a property of the one or more words. The <weight> may refer to a weight to be applied to the words. In some examples, the weight may be used to give particular words or phrases in the dynamic vocabulary more weight in automated speech recognition and natural language understanding. For example, entries in the dynamic vocabulary that are more popular at a given time may be given more weight. The <literal sequence> column may refer to a sequence of words in a detected phrase. For example, the literal sequence may be a word or phrase in the dynamic vocabulary. The <canonical> column may refer to a canonical form of the literal sequence. In the example of a voice-controlled music player application 110, some sample entries in a table for the dynamic vocabulary 106 as received from the application 110 may be: [Music, Title, 0, Born with my DNA, cd_1_title_1] and [Music, Artist, 0, Bruce Springfield]. For example, the first entry may have an intent of "Music," a property of "Title," a weight of "0," a literal sequence of "Born with my DNA," and a canonical of "cd_1_title_1." In some examples, the canonical form may be used to find a particular title associated with a particular track on a CD to play. In some examples, where the title is not associated with a concrete compact disk (CD) and place on the CD, the title may not be canonicalized and can be used to search for titles with given artist in some cloud databases. The second entry may have an intent of "Music," a property of "Artist," a weight of "0," a literal sequence of "Bruce Springfield." As in the second entry, in some examples, an entry may not include a value for all columns. For example, there may not be a different canonical form for "Bruce Springfield." In some examples, the weight of "0" may indicate that the particular song "Born with my DNA" or artist "Bruce Springfield" may not be currently more popular than other songs and artists. Thus, a weight of "0" may indicate an equally distributed probability that may be used for most applications and use-cases. However, other weights than "0" may be used to indicate a higher popularity and thus probability of use. In some examples, the weight can be derived from some usage statistics and may change over time. For example, the weight may be based on pop charts or other publicly available popularity rankings. In some examples, time-adaptive weights may improve the recognition accuracy for frequently spoken voice queries when using large dynamic vocabularies. For example, the weights may be used to normalize probabilities in a language model when including named entities with multiple words. As one example, the song title "Born with my DNA" has four total words and may thus be normalized using weights accordingly. For example, the language model may be adjusted using weights to increase collocation probability of the phrase "Born with my DNA." Thus, the probability of the word sequence as in the phrase occurring together can be increased.

In another example, the application 100 may be a voice-controlled air conditioning (AC) system. For example, a voice-controlled AC system having two rooms may provide the following dynamic vocabulary entries: [Climate, Room, 0, living room, _room_1], [Climate, Room, 0, lounge, _room_1], [Climate, Room, 0, bath, _room_2], [Climate, Room, 0, bathroom, _room_2]. Thus, although the a room may be referred to using different terms, such as living room or lounge, the room may have a single canonical form "_room_1" that can be used by the system in performing various tasks indicated by intent.

The diagram of FIG. 1 is not intended to indicate that the example system 100 is to include all of the components shown in FIG. 1. Rather, the example system 100 can be implemented using fewer or additional components not illustrated in FIG. 1 (e.g., additional audio, vocabularies, table columns, modules, applications, etc.). For example, although the applications shown in the example of FIG. 1 include a music application and a climate control system, the applications may include a navigation application that can include favorite points of interests such as restaurants or bars. In some examples, the applications can include a media application that can include favorite television programs.

Figure 2:
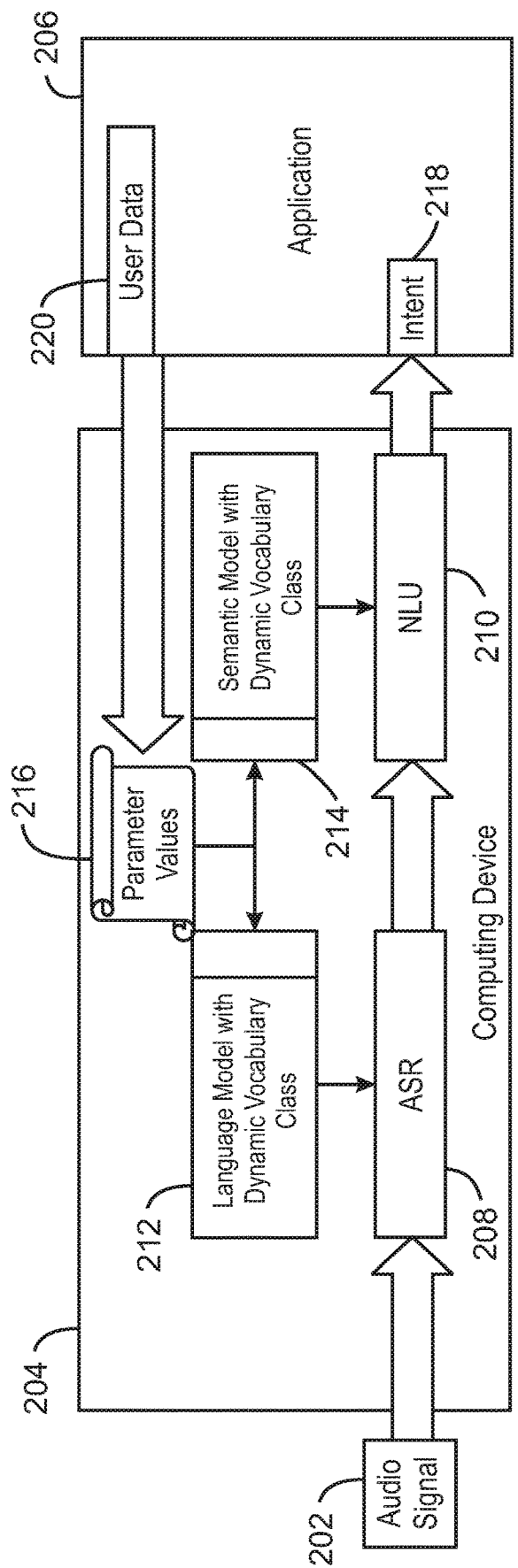
FIG. 2 is a detailed block diagram illustrating another example system for detecting intent in voiced audio using a dynamic vocabulary.

FIG. 2 is a block diagram illustrating an example system for detecting intent in voiced audio using a dynamic vocabulary. The example system is referred to generally by the reference number 200 and can be implemented in the computing device 900 below in FIG. 9 using the processes 400 and 500, or method 700 of FIGS. 4, 5, and 7 below.

The example system 200 includes an audio signal 202 received at a computing device 204. For example, the computing device 204 may be computing device 900 of FIG. 9 below. The computing device 204 is communicatively coupled to an application 206. In some examples, the application may be installed on the computing device 204. The computing device 204 includes an ASR 208 that is communicatively coupled to an NLU 210. For example, the NLU 210 may be an intent and property classifier, such as the NLU 108 of FIG. 1 above. The ASR 208 may be communicatively coupled to a language model with a dynamic vocabulary class 212. For example, the language model may be a statistical n-gram Markov model. The NLU 210 is communicatively coupled to a semantic model with a dynamic vocabulary class 214. For example, the semantic model 214 may be a combination of an intent model and a property model. The language model 212 and the semantic model are both shown receiving parameter values 216 from the application 206. The application 206 is shown receiving an intent 218 from the NLU 210. The application 206 is also shown sending user data 220 including parameter values 216 to the computing device 204 to include in the language model 212 and semantic models 214. For example, the language model 212 and the semantic model 214 may both be trained using a dynamic vocabulary that includes the parameter values, in addition to the common vocabulary, as described in greater detail with respect to FIG. 6 below.

In the example of FIG. 2, the language model 212 may be a word-class based language model where each word-class comprises at least one word with a bigram probability of P(<word>|<class>). Given the examples of FIG. 1 above, the language model 212 may have at least 3 classes "Room", "Title", "Artist". The probability P(word|Room) may be derived from the dynamic vocabulary. In some examples, a universal distribution may be considered. For example, the probability of a word may be calculated as 1/(number of dynamic vocabulary words with an identical semantic class). In some examples, a grapheme-to-phoneme model can be used to compute the phonetic representation of each word so that it can be integrated into the search space of the ASR. For example, the grapheme-to-phoneme model may map a sequence of letters to a sequence of phonemes. In some examples, the grapheme-to-phoneme model can be based on weighted finite state transducers or recurrent neuronal networks. The grapheme-to-phoneme model component may be included in the system 200 with dynamic vocabulary as only those words that are included in the ASR search space can be recognized and analyzed by postponed components, such as the NLU 210. In some examples, the class based language model 212 can be estimated using a sub-set of the training data vocabulary as being dynamic vocabulary. For example, the language model 212 can be trained using the method 600 of FIG. 6 below.

The ASR 208 may thus generate one or more hypotheses based on the audio signal 202 and the language model 212. The NLU 210 can then detect an intent from the one or more hypotheses as described in greater detail with respect to FIGS. 3 and 4 below. In some examples, the NLU 210 can also recognize one or more properties for each intent as described in greater detail with respect to FIG. 5 below. For example, the intent of the voice query "Play a song from Bruce Springfield" may be "Music, play song" and the property may be "Artist=Bruce Springfield."

The diagram of FIG. 2 is not intended to indicate that the example system 200 is to include all of the components shown in FIG. 2. Rather, the example system 200 can be implemented using fewer or additional components not illustrated in FIG. 2 (e.g., additional audio, vocabularies, table columns, modules, applications, etc.).

Figure 3:
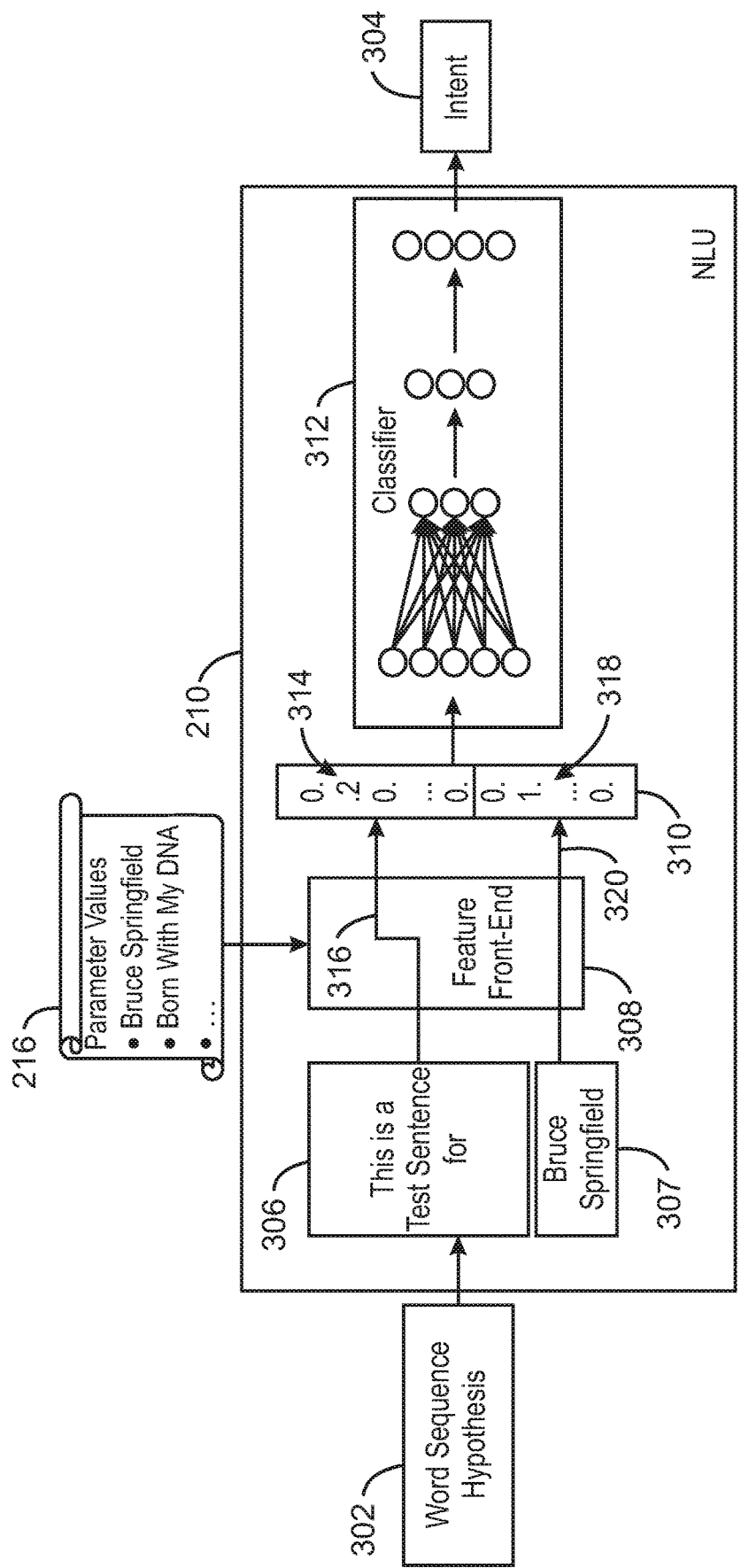
FIG. 3 is a block diagram illustrating an example apparatus for classifying intent and properties.

FIG. 3 is a diagram illustrating an example apparatus for classifying intent and properties. The example apparatus is generally referred to by the reference number 300 and can be implemented in the computing device 200 of FIG. 2 above or the computing device 900 of FIG. 9 below. For example, the apparatus 300 can be used to implement the process 400 of FIG. 4 below, or the natural language understander (NLU) 934 of the computing device 900 or the natural language understanding module 1010 of the computer readable media 1000 of FIG. 10 below.

The apparatus 300 of FIG. 3 includes an NLU 210 shown receiving a word sequence hypothesis 302 from an ASR and parameter values 216 and outputting an intent 304. For example, the word sequence hypothesis 302 may be generated by the ASR 104 or the ASR 208 of FIGS. 1 and 2 above. As shown in FIG. 3, an example word sequence hypothesis 302 may be "This is a sentence for Bruce Springfield." For example, the first part "This is a Test Sentence for" 306 of the word sequence hypothesis 302 may be common vocabulary and the second part "Bruce Springfield" 307 may be dynamic vocabulary. In some examples, the feature front-end 308 of the NLU 210 may determine whether one or more words in the word sequence hypothesis 302 are common vocabulary or dynamic vocabulary. In some examples, the parameter values 216 may be received from an application. In some examples, the parameter values 216 may be received from a database or other data source. For example, the parameter values 216 may be dynamic words taken from the application, database, or other data source.

The NLU 210 also includes a feature front-end 308 that is shown generating a vector 310 to be sent to a classifier 312. The vector 310 may include a weighted bag of words feature vector 314 associated with the common vocabulary 306 as indicated by an arrow 316 and a feature vector 318 associated with the dynamic vocabulary 308 as indicated by an arrow 320. Although the vector 310 is shown using a floating point format to include weights, in some examples, the vector 310 may be in a binary format or a non-weighted bag of words feature vector. For example, each element of the vector 310 may be determined to either be present or not present in the word sequence hypothesis 302. For example, in the example of FIG. 3, the 1 in feature vector 318 indicates the presence of "Bruce Springfield" in the word sequence hypothesis 302. In some examples, the vector 310 may have a dimension based on a number of training words. For example, for a training set including 500 most differentiating common vocabulary words, the dimension of a bag of words feature vector 314 may be 500. In some examples, the feature vector 318 corresponding to the second part 307 can also be represented as a bag-of-words feature vectors. The feature vector 318 corresponding to the dynamic vocabulary may be appended to the feature vector 314 to generate the vector 310. The vector 310 is thus shown being generated by the feature front-end 308 and being sent to the classifier 312 for scoring. For example, the classifier 312 may be a deep neural network (DNN) or a recurrent neural network (RNN), or a condition random field, a hidden Markov Model max maximum entropy model, or any other suitable type of classifier. The NLU 210 includes the classifier 312 to perform scoring on the received vector 310 and output a detected intent 304. For example, the intent 304 may be a command that controls a music player application. In some examples, the classifier 312 may also recognize one or more properties associated with the detected intent 304. In some examples, the classifier 312 may include a model that is trained on both common and dynamic data, as described below. In some examples, the common data may include any labelled data that can be reasonably assumed to be unchanging or static. For example, the common data can include pre-defined default song titles, and phrases such as: "I want to increase temperature|(increase_temperature)", or "Play a random song|(play_random_song)". In some examples, for a generic parameter dynamic vocabulary implementation, the common data can also include data that contains a "carrier phrase" with a generic tag. For example, the carrier phrase "Play a song called {song_title}" includes the generic tag {song_title} that can be substituted when processing through the feature front-end. In some examples, dynamic data may include labelled data that can be assumed to be changing or dynamic and include one or more tags. For example, a dynamic data may be: "Bruce Springfield|{song_title}", "kitchen|{room}".

The diagram of FIG. 3 is not intended to indicate that the example apparatus 300 is to include all of the components shown in FIG. 3. Rather, the example apparatus 300 can be implemented using fewer or additional components not illustrated in FIG. 3 (e.g., additional parameter values, hypotheses, modules, outputs, etc.). For example, the NLU 210 may also include a type casting module for property recognition as described in FIG. 5 below. In some examples, the NLU 210 may also output a recognized property associated with the intent 304.

Figure 4:
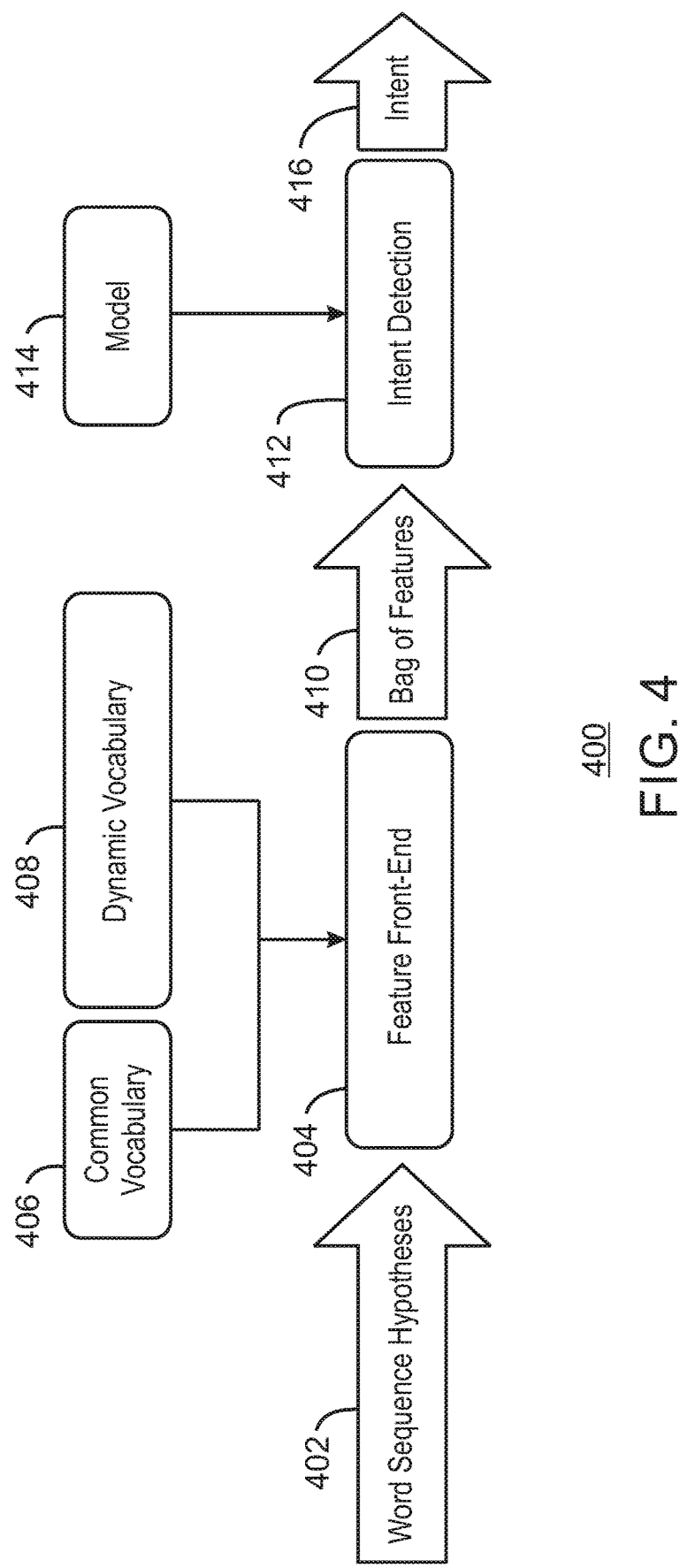
FIG. 4 is a flow chart illustrating an example process for classifying intent using a dynamic vocabulary.

FIG. 4 is a flow chart illustrating an example process for intent detection using a dynamic vocabulary. The example process is generally referred to by the reference number 400 and can be implemented in the NLU 108 or the NLU 210, of FIGS. 1-3 above or the computing device 900 of FIG. 9 below.

At arrow 402, a word sequence hypotheses is received. For example, the word sequence hypotheses may be received from an ASR. For example, each of the word sequence hypotheses may be a sequence of words detected by the ASR.

At block 404, the feature front end receives the sequence of work hypotheses, a common vocabulary 406, and a dynamic vocabulary 408, and concatenates the common vocabulary 406 and the dynamic vocabulary 408 to generate a bag of features 410. For example, the common vocabulary 406 may include static words and phrases that do not change over time. In some examples, the common vocabulary 406 may have been generated or provided in advance. The dynamic vocabulary 408 may include a set of relations between word sequences and semantic classes that are generated at runtime. Examples of a dynamic vocabulary include named entities, such as titles of songs, names of bands or singers, TV shows, musicals, etc. Other examples include of dynamic vocabulary include words like types of rooms ("living room", "saloon") or temperature ranges. In some examples, dynamic vocabulary may also include numerical values, date and time, object properties, addresses, directions, locations, units, etc. For example, object properties can include range of colors, sizes, shapes, dimensions, tastes, prices etc. Date and time can include weeks, month names, etc. Units may include units of length such as inches, centimeters, weight such as pounds or kilograms, etc. In some examples, some words may be included and other words may be excluded from the vocabulary of the device. For example, such inclusion and exclusion of particular words may result in increased accuracy, decreased memory footprint, and computation. In some examples, the bag of features 410 may be a vector. As used herein, a bag refers to a multiset of words or features in which order does not matter, but multiple instances of a word or feature may be allowed. In some examples, the vector may be a concatenation of sub vectors. For example, the vector may be a concatenation of two sub vectors. One of the sub vectors may be a bag of words feature vector derived from the common vocabulary 406. A bag of words feature vector may be a vector including the most distinguishing words. In some examples, most distinguishing words can be determined using statistical methods based on weighted word counts in each intent. For example, one statistical method that can be used to determine most distinguishing words is Term-Frequency Inverse Document Frequency (TF-IDF). In some examples, any other suitable methods for determining most distinguishing words may be applied. In some examples, the bag of words feature vector may be binary. For example, each word in the bag of words feature vector may exist in the word sequence hypothesis or not exist in the word sequence hypothesis. In some examples, a value of "0" may indicate the word does not exist, while a value of "1" may indicate that the word exists. In some examples, the bag of words feature vector may be weighted and dimension limited. For example, the bag of words feature vector may be weighted based on probability and have a dimension limited based on the number of words in the common vocabulary.

In some examples, the second sub vector may be a feature vector that semantically triggers words in the word sequence hypotheses that are provided by the dynamic vocabulary. Thus, in some examples, the bag of features vector 410 may include a first sub vector <TF-IDF weighted/selected bag of words, e.g. 500 dimensional> and a second sub vector<occurrence of dynamic vocabulary in the word hypotheses, semantically ordered and weighted given the dynamic vocabulary, e.g. 10 dimensional>. Term frequency-inverse document frequency (TF-IDF) as used herein, refers to a numerical statistic that is intended to reflect how meaningful the word is in differentiating between intents. For example, the TF-IDF value may increase proportionally to the number of times a word appears in the word sequence hypothesis. However, the value of the TF-IDF may be offset by the frequency of the word in the collection of training data. This offset may help to adjust for the fact that some words appear more frequently in general.

In some examples, in a generic parameter approach, dynamic vocabulary phrases as defined in the dynamic vocabulary 408 may be extracted from word sequence hypotheses 402 and replaced with "generic tags". This replacement can be performed using a longest matching algorithm to reduce errors. In some examples, a longest matching dynamic parameter check can be performed before the features are generated to ensure that detected dynamic parameters are not subsets of larger dynamic parameters. For example, generic templates may be saved in a list and checked during intent detection and parameter recognition. In this way, "Bruce Springfield" may be detected as an "Artist" parameter, rather than just "Bruce" being detected and replaced with an "Artist" parameter. Similarly, common vocabulary that are part of a longer dynamic vocabulary word may similarly be detected as a dynamic vocabulary. For example, the words "in" and "the" may be detected as part of a dynamic vocabulary in a song title rather than common vocabulary. Thus, generic templates may be used for both intent detection and parameter recognition. In some examples, a Levenshtein distance can be used in the matching algorithm to fuzzy approximate the dynamic vocabulary in case of ASR errors or partial user queries.

In some examples, another approach may include the ASR tagging the words of the word sequence hypotheses 402. For example, such an approach may not use a matching algorithm as the ASR may include information of which words precisely belong to a dynamic vocabulary 408. For example, even when not using the generic parameter approach discussed above, the presence of dynamic vocabulary may be determined. In some examples, the matching algorithm for determining dynamic vocabulary may be agnostic as to whether the system uses a bag-of-words feature vector or other features for the dynamic vocabulary.

In some examples, the feature front-end may alternatively include a rulebook that can be used to check whether a combination of words exists or not. For example, in the case of song queries, the artist part of a word sequence hypothesis 402 can be distinguished from the song title part. These parts can be present in various parts of the word sequence hypotheses 402 and can be meaningful in various combinations. An example of a rulebook for this case can be used to keep artist and song title separate in the dynamic vocabulary 408. The rulebook can be used to check for existence of both parts at the same time, or existence of one part to "trigger" the presence of dynamic vocabulary in the case that the "title" word or a synonym is present in a word sequence hypothesis 402.

At block 412, an intent detection is performed using the bag of features 410 and the model 414. For example, the intent detection may be performed by a statistical intent detection classifier. For example, the statistical intent detection classifier may be a trained RNN or DNN. In some examples, the model 414 for the statistical intent detection classifier may be estimated on representative training data. For example, the estimation may be performed by considering a sub-set of the training data vocabulary of being dynamic. In some examples, the model 414 can be trained before runtime using the process 600 of FIG. 6 below. The detected intent 416 may be output as indicated by an arrow. For example, the detected intent 416 may be output to an application, such as the application 110 of FIG. 1 above or the application 206 of FIG. 2 above. In some examples, the format of the intent 416 may include a domain such as "Music" in addition to an intent of, for example, "play" to be in the form "Music, Play." In some examples, one or more parameters may also be recognized and sent to an application with the intent 416. In some examples, the parameters may be included in parentheses and may include, for example, an artist name, a title of a song, etc. For example, the one or more properties may be recognized using the method 500 described in FIG. 5 below.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation.

Figure 5:
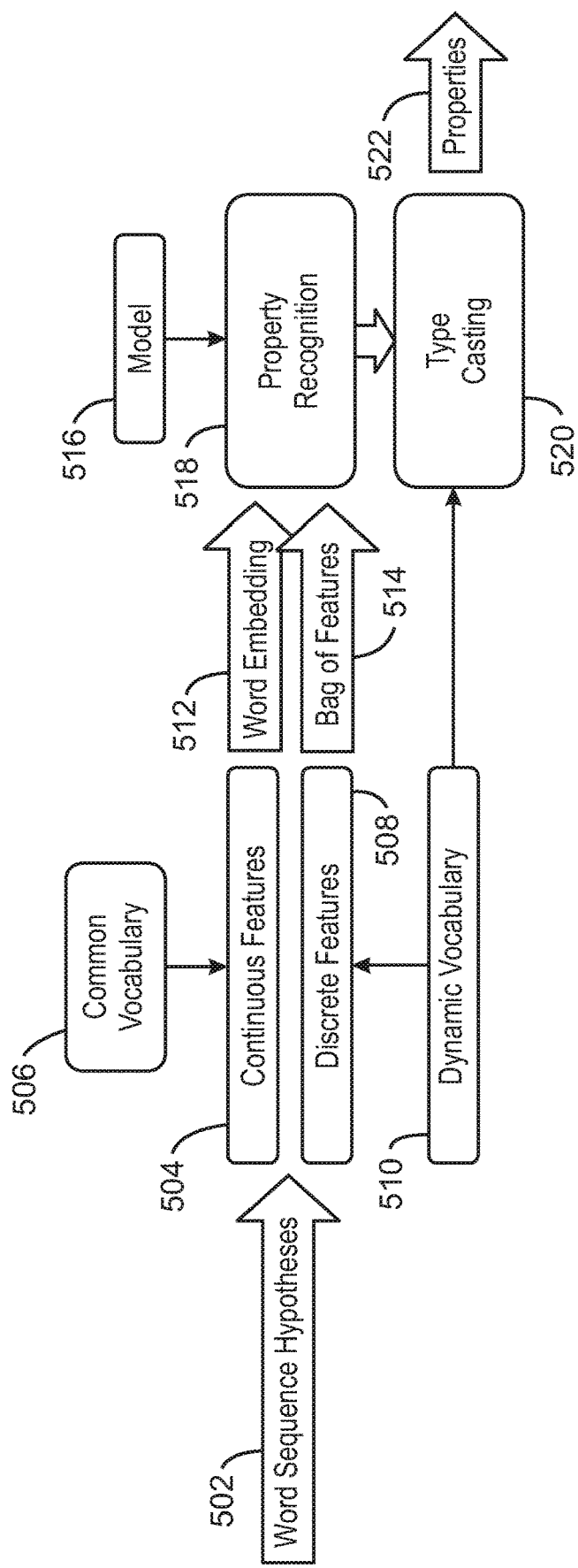
FIG. 5 is a flow chart illustrating an example process for classifying properties using a dynamic vocabulary.

FIG. 5 is a flow chart illustrating an example process for classifying properties using a dynamic vocabulary. The example process is generally referred to by the reference number 500 and can be implemented in the NLU 108 or the NLU 210, of FIGS. 1-3 above or the computing device 900 of FIG. 9 below.

At block 502, one or more word sequence hypotheses are received. For example, the word sequence hypotheses may be received from an ASR. For example, the word sequence hypotheses may be alternate sequences of words that may possibly match speech in an audio. In some examples, the ASR may identify many hypothesis, but output the one word sequence hypothesis that the ASR scores as most likely.

At block 504, continuous features are derived from the word sequence hypotheses 502 and a common vocabulary 506. For example, the continuous features may be derived by a feature front-end. In some examples, the continuous features may be used to take the order of words in a word sequence hypothesis into account. In some examples, the continuous features may take the form of word embedding. For example, the continuous features may include a vector representation of each word in the word sequence hypothesis.

At block 508, discrete features are derived from the sequences of word hypotheses and a dynamic vocabulary 510. For example, the discrete features may be derived by a feature front-end. The discrete features may include feature vectors that may be concatenated to generate bags of features as described in FIG. 4 above. For example, the discrete features 508 may be similar to the features 410 used in the intent detection 412 above in FIG. 4. In some examples, only the discrete features 508 may be derived from the dynamic vocabulary 510.

At block 512, the word embedding is derived from the continuous features 504. For example, each word can be mapped to a numerical vector based on the dictionary created during model training. The word embedding may then be sent to the property recognition block 518.

At block 514, the bag of features may be derived from the discrete features 508. For example, vector values can be set to 1 at the corresponding index for each tag present in the hypothesis, and 0 at the corresponding index for each tag not present in the hypothesis. The bag of features may then be sent to the property recognition block 516. In some examples, the word embedding and bag of features may be concatenated into a single vector and sent to the property recognition block 518 for processing.

At block 516, a model may be trained. For example, the model for the statistical property recognition may be estimated on representative training data similar to the intent detection classifier. In some examples, the estimation may be achieved by considering a sub-set of the training data vocabulary as being dynamic. In some examples, the same training data and sub-set of dynamic vocabulary 510 may be used to train models for both the intent detection and property recognition 518.

At block 518, a property recognition can be performed using the model 516 to compute a semantic tag for each word in a word sequence hypothesis. In some examples, the probability P(<tag>|<word_i>) can be calculated for each word_i in the word sequence hypothesis. For example, an example list of tags for the recognized voice query "Play a song from Bruce Springfield" can be "U U U U <artist> <artist>" where "U" denotes an unknown semantic interpretation for the given word. In some examples, the property recognition can be performed by some sequence labeling. For example, the model 516 may be a condition random field, a hidden Markov model or a recurrent neuronal network can be used for property recognition. In some examples, the property recognition may also include the use of generic templates as discussed in FIG. 4 above. For example, the generic templates may be implemented in the feature front end. As an example, a sentence may be input into the property recognizer "I want to listen to {song_query} with volume 50." The property recognizer may remember that the property was "Bruce Springfield" to generate a meaningful result. For example, the output of property recognizer can then be song_query={"song_query"} and volume="50". For generating the final result, the property recognition 518 can switch {song_query} with "Bruce Springfield". Thus, the word {song_query} may be included as the context will matter in recognition of other properties. For example, the property recognition 518 approximates the P(<tag>|word) in context of whole phrase of the word sequence hypothesis 502 and includes it in the "1st best <tag> hypothesis" result in response to detecting that the tag isn't 'U' (Unknown).

At block 520, a type casting is performed on the tagged hypotheses. In some examples, the type casting may take as input semantically grouped words and compute a canonical representation. For example, the type casting may compute "_room_1" given the two words "living" and "room" from the semantic tag 'room'. In some examples, type casting can be performed using distance metrics. In some examples, a Levenshtein distance or a statistical classifier may be used to perform type casting. For example, the Levenshtein distance may be the minimum number of single-character edits required to change one word into the other. Single character edits, may include, for example, insertions, deletions or substitutions. For example, in the case that the type castings 520 cannot match a property received from the property recognition 518 to an exact real property understood by an application, the type casting 520 can perform a fuzzy matching or a matching using the Levenshtein distance algorithm with a previously agreed cut-off value to determine a best possible match. In some examples, type casting may be performed using a database including one or more words and related canonical representations. In some examples, type casting can be performed using a DNN or similar neural network.

At block 522, one or more properties can be output. For example, a final property 522 may be derived from the sequence of 1st best <tag> hypotheses output by the property recognition block 518. In the example described above, the properties may be the song title: "Born with my DNA." or the canonical "cd_1_title_1."

This process flow diagram is not intended to indicate that the blocks of the example process 500 are to be executed in any particular order, or that all of the blocks are to be included in every case. Further, any number of additional blocks not shown may be included within the example process 500, depending on the details of the specific implementation. For example, additional features may be derived, such as dynamic features from the dynamic vocabulary 510. For example, the dynamic features may be tags such as <artist> or <song>. In some examples, the dynamic features may include lower-word-level embedding such as letter-embedding. The dynamic features may be part of a feature vector fed to a property recognition engine.

Figure 6:
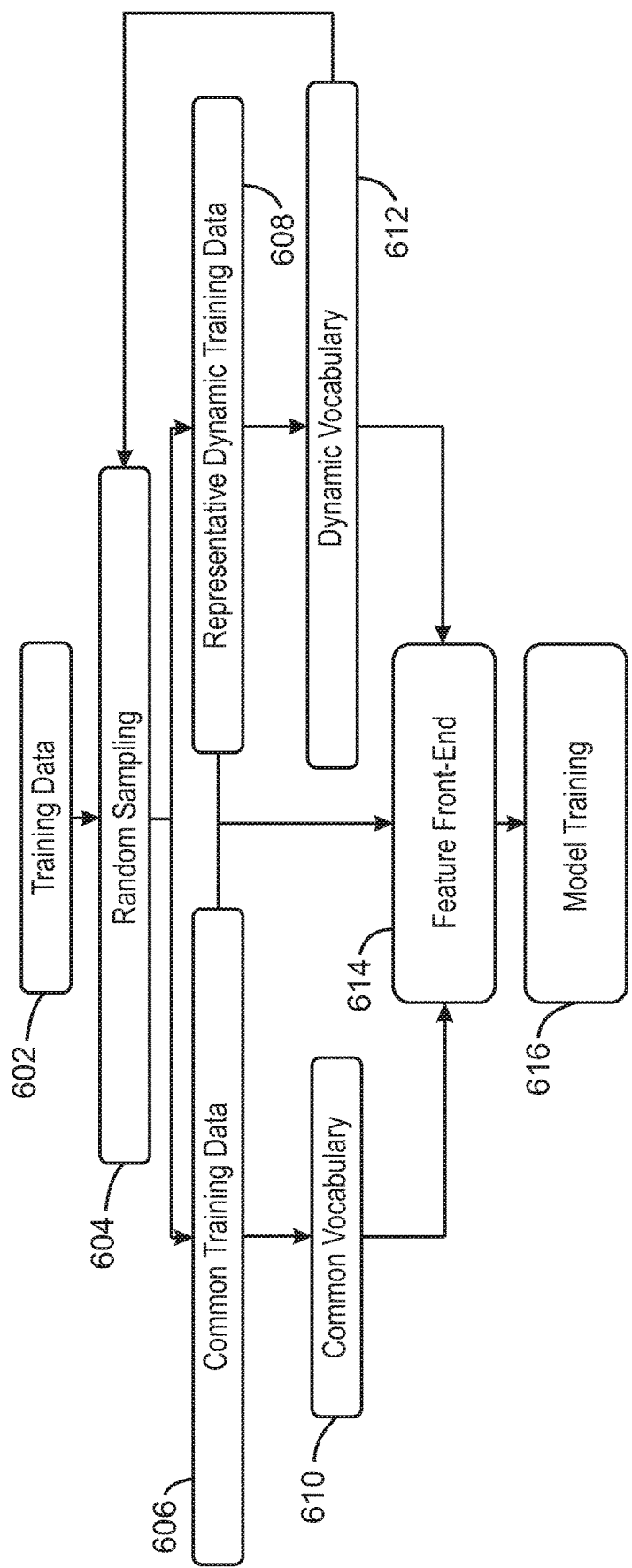
FIG. 6 is a flow chart illustrating an example process for training models using a dynamic vocabulary.

FIG. 6 is a flow chart illustrating an example process for training models using a dynamic vocabulary. The example process is generally referred to by the reference number 600 and can be implemented in the model trainer 936 of the computing device 900 of FIG. 9 or the model training module 1012 of the computer readable media 1000 of FIG. 10 below. In some examples, the method 600 can be used for ASR statistical model estimation, NLU intent detection model estimation, and NLU property recognition model estimation. For example, the language model 212 and semantic model 214 of FIG. 2, the model 414 used for intent detection 412 of FIG. 4, and the model 516 used for property recognition 518 of FIG. 5 can be estimated using the process 600.

At block 602, training data is received. For example, the training data may include sets of sentences to be used to train a model.

At block 604, the training data is separated into common training data 606 and representative dynamic training data 608 using random sampling. In some examples, the random sampling may be guided by semantic information from the dynamic vocabulary. For example, the random sampling may be guided using the available semantic word classes in the dynamic vocabulary. For example, in the generic parameters case, to guide the training process the processor may generate X number of examples such as "I want to listen to {song_query}" and combinations of similar phrases.

At block 610, a common vocabulary is calculated out of the common training data. In some examples, the common vocabulary may include words and phrases that do not change or change slowly over time. For example, the phrases may include words that have properties which do not change or change slowly over time.

At block 612, a dynamic vocabulary is calculated out of the representative dynamic training data. For example, the dynamic vocabulary may have dynamic vocabulary tags replaced for dynamic vocabulary. For example, instances of "Bruce Springfield" may be replaced with an <Artist> dynamic vocabulary tag.

At block 614, a feature frontend may be generated that includes the vocabulary 610 and dynamic vocabulary 612. The feature front-end may also receive the common training data 606 and the representative dynamic training data 608.

At block 616, the feature front-end feed data into model training to estimate parameters that best fits the training data. For example, one or more parameters of a model may be estimated based on the common vocabulary 610, the dynamic vocabulary 612, the common training data 606, and the representative dynamic training data 608, or any combination thereof. For example, the model to be trained may be a language model, a semantic model, an intent detection model, a property recognition model, etc. In some examples, any suitable method of training the models may be used. Because the trained model may incorporate dynamic vocabulary 612, the model may not need to be retrained at runtime. For example, the trained model may incorporate specific dynamic vocabularies that can change during runtime, but the model itself may be unchanged during runtime. Thus, not having to retrain the model during runtime may result in more efficient runtime and the therefore the ability to run the system on embedded devices having less processing power.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation. In some examples, the feature frontend 614 and the model training 616 blocks may be adapted to the specific type of model to be trained. In some examples, the models to be trained may be of various architectures. For example, the models may include models of feedforward neural networks (FNNs), recurrent neural networks (RNNs) such as long short-term memory (LSTM) networks, as well as non-neural networks, such as support vector machines (SVMs).

Figure 7:
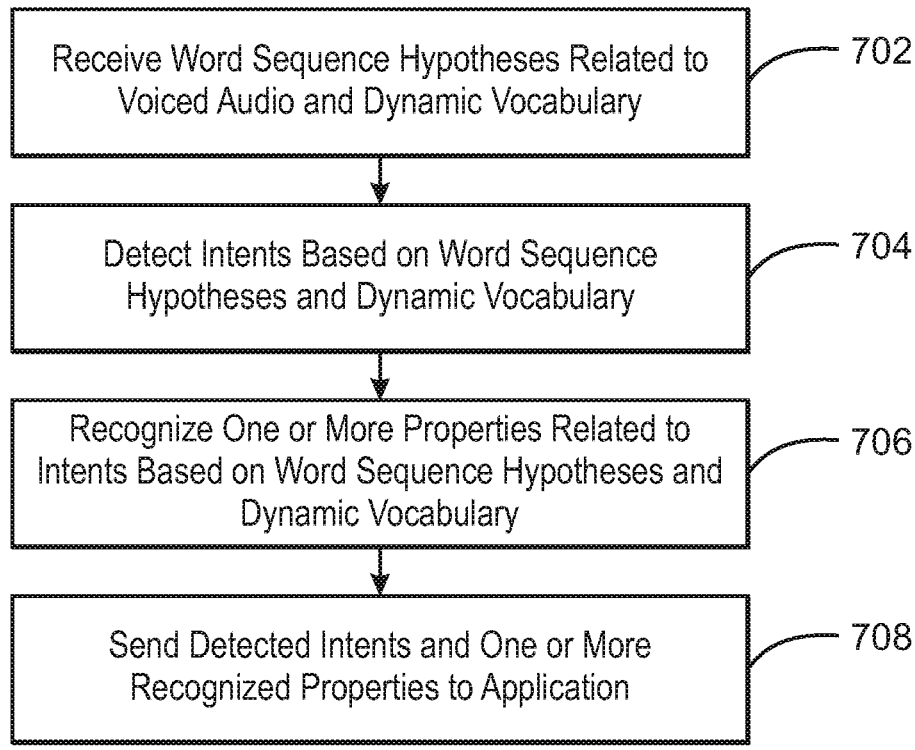
FIG. 7 is a flow chart illustrating a method for detecting intent in voiced audio using on a dynamic vocabulary.

FIG. 7 is a flow chart illustrating a method for detecting intent in voiced audio using a bag of features generated based on a dynamic vocabulary. The example method is generally referred to by the reference number 700 and can be implemented in the NLU 108 of system 100 of FIG. 1 above, the NLU 210 of the computer device 204 of 2 and 3 above, using the processor 902 and NLU 934 of the computing device 900 of FIG. 9 below, or the NLU module 1010 of the computer readable media 900 of FIG. 9 below. The method 700 may be performed using the processes 400 and 500 described in FIGS. 4 and 5 above.

At block 702, a processor receives one or more word sequence hypotheses related to a voiced audio and a dynamic vocabulary. For example, the word sequence hypotheses may include sequences of detected words. In some examples, the word sequence hypotheses may be generated by and received from an automated speech recognizer based on the voiced audio and the dynamic vocabulary. For example, the dynamic vocabulary may be generated based on user data received from an application.

At block 704, the processor detects one or more intents based on the word sequence hypotheses and the dynamic vocabulary. For example, the processor can generate a bag of features based on the dynamic vocabulary and a received common vocabulary. The processor can then process the bag of features using a model trained using representative dynamic training data. In some examples, the processor can detect longer dynamic vocabulary before shorter dynamic vocabulary.

At block 706, the processor recognizes one or more properties related to the intents based on the word sequence hypotheses and the dynamic vocabulary. For example, the processor can generate a set of continuous features based on a received common vocabulary. The processor can then also generate a set of discrete features based on the dynamic vocabulary. The processor can then generate a bag of features to be used to recognize the property. In some examples, the processor can semantically tag words in the word sequence hypothesis based on the generated bag of features. In some examples, the processor can generate a canonical representation based on one or more words in the word sequence hypothesis with semantic tags.

At block 708, the processor sends the detected intents and one or more recognized properties to an application. For example, the application may be a voice-controlled music player application, a voice-controlled AC system, a voice-controlled map application, etc.

This process flow diagram is not intended to indicate that the blocks of the example process 700 are to be executed in any particular order, or that all of the blocks are to be included in every case. Further, any number of additional blocks not shown may be included within the example process 700, depending on the details of the specific implementation.

Figure 8:
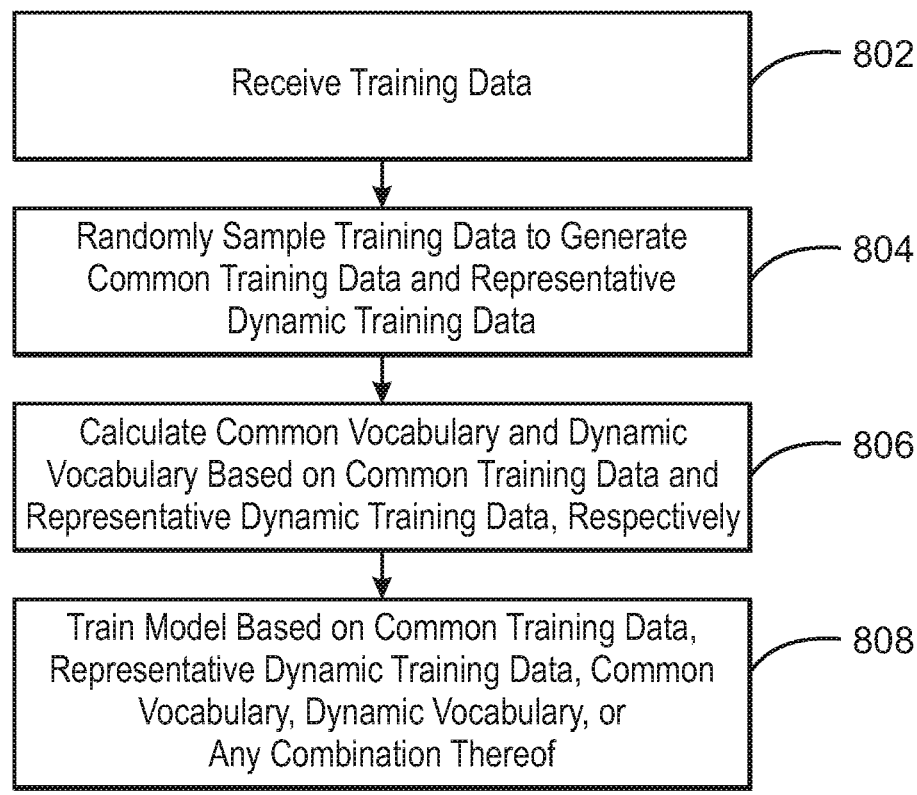
FIG. 8 is a flow chart illustrating a method for training a model using a dynamic vocabulary.

FIG. 8 is a flow chart illustrating a method for training models based on representative dynamic training data. The example method is generally referred to by the reference number 800 and can be implemented in the computer device 204 of FIG. 2 above, using the processor 902 and model trainer 936 of the computing device 900 of FIG. 9 below, or the model training module 1012 of the computer readable media 900 of FIG. 9 below. The method 800 may be used to perform the process 600 described in FIG. 6 above.

At block 802, a processor receives training data. For example, the training data may include sets of sentences to be used to train a model.

At block 804, the processor randomly samples the training data to generate a common training data and a representative dynamic training data. For example, the common training data may include static words to be used to train a model. The representative dynamic training data may include named entities and entity types to be used to train a model.

At block 806, the processor calculates a common vocabulary based on the common training data and a dynamic vocabulary based on the representative dynamic training data. For example, the common vocabulary may include static words that do not represent any named entities. The dynamic vocabulary may include entity tags that can change value as needed based on updated information from an application.

At block 808, the processor trains a model based on the common training data, the representative dynamic training data, the common vocabulary, the dynamic vocabulary, or any combination thereof. For example, the model to be trained may be a language model, a semantic model, an intent detection model, or a property recognition model.

This process flow diagram is not intended to indicate that the blocks of the example process 800 are to be executed in any particular order, or that all of the blocks are to be included in every case. Further, any number of additional blocks not shown may be included within the example process 800, depending on the details of the specific implementation.

Figure 9:
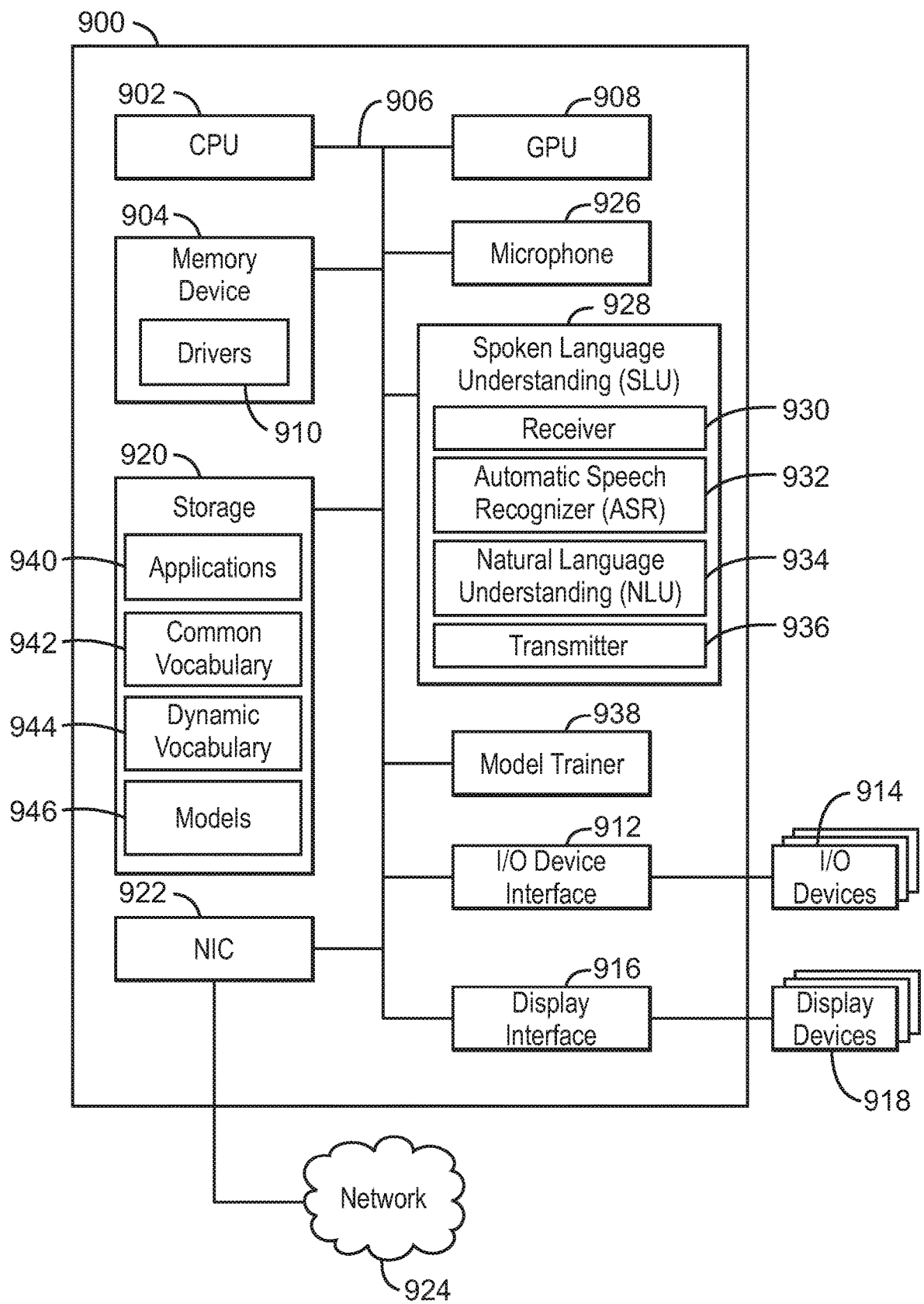
FIG. 9 is block diagram illustrating an example computing device that can detect intent in voiced audio using a dynamic vocabulary.

Referring now to FIG. 9, a block diagram is shown illustrating an example computing device that can perform spoken language understanding using a dynamic vocabulary. The computing device 900 may be, for example, a laptop computer, desktop computer, tablet computer, mobile device, or wearable device, among others. In some examples, the computing device 900 may be an embedded device, such as a robot, a car head unit, or a home appliance. The computing device 900 may include a central processing unit (CPU) 902 that is configured to execute stored instructions, as well as a memory device 904 that stores instructions that are executable by the CPU 902. The CPU 902 may be coupled to the memory device 904 by a bus 906. Additionally, the CPU 902 can be a single core processor, a multi-core processor, a computing cluster, or any number of other configurations. Furthermore, the computing device 900 may include more than one CPU 902. In some examples, the CPU 902 may be a system-on-chip (SoC) with a multi-core processor architecture. In some examples, the CPU 902 can be a specialized digital signal processor (DSP) used for image processing. The memory device 904 can include random access memory (RAM), read only memory (ROM), flash memory, or any other suitable memory systems. For example, the memory device 904 may include dynamic random access memory (DRAM).

The memory device 904 can include random access memory (RAM), read only memory (ROM), flash memory, or any other suitable memory systems. For example, the memory device 904 may include dynamic random access memory (DRAM).

The computing device 900 may also include a graphics processing unit (GPU) 908. As shown, the CPU 902 may be coupled through the bus 906 to the GPU 908. The GPU 908 may be configured to perform any number of graphics operations within the computing device 900. For example, the GPU 908 may be configured to render or manipulate graphics images, graphics frames, videos, or the like, to be displayed to a user of the computing device 900.

The memory device 904 can include random access memory (RAM), read only memory (ROM), flash memory, or any other suitable memory systems. For example, the memory device 904 may include dynamic random access memory (DRAM). The memory device 904 may include device drivers 910 that are configured to execute the instructions for detecting intent and recognizing properties from voiced audio. The device drivers 910 may be software, an application program, application code, or the like.

The CPU 902 may also be connected through the bus 906 to an input/output (I/O) device interface 912 configured to connect the computing device 900 to one or more I/O devices 914. The I/O devices 914 may include, for example, a keyboard and a pointing device, wherein the pointing device may include a touchpad or a touchscreen, among others. The I/O devices 914 may be built-in components of the computing device 900, or may be devices that are externally connected to the computing device 900. In some examples, the memory 904 may be communicatively coupled to I/O devices 914 through direct memory access (DMA).

The CPU 902 may also be linked through the bus 906 to a display interface 916 configured to connect the computing device 900 to a display device 918. The display device 918 may include a display screen that is a built-in component of the computing device 900. The display device 918 may also include a computer monitor, television, or projector, among others, that is internal to or externally connected to the computing device 900.

The computing device 900 also includes a storage device 920. The storage device 920 is a physical memory such as a hard drive, an optical drive, a thumbdrive, an array of drives, a solid-state drive, or any combinations thereof. The storage device 920 may also include remote storage drives.

The computing device 900 may also include a network interface controller (NIC) 922. The NIC 922 may be configured to connect the computing device 900 through the bus 906 to a network 924. The network 924 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 900 further includes a depth camera 926. For example, the depth camera may include one or more depth sensors. In some example, the depth camera may include a processor to generate depth information. For example, the depth camera 926 may include functionality such as RealSense™ technology.

The computing device 900 further includes a spoken language understanding module 928. For example, the spoken language understanding module (SLU) 928 can be used to detect intent in one or more spoken words. The spoken language understanding module 928 can include a receiver 930, an automatic speech recognizer 932, a natural language understander (NLU) 934, and a transmitter 936. In some examples, each of the components 930-936 of the SLU 928 may be a microcontroller, embedded processor, or software module. The receiver 930 can receive a word sequence hypothesis related to a voiced audio and a dynamic vocabulary. In some examples, the receiver 930 can receive user data from the application and generate the dynamic vocabulary based on the user data. In some examples, the receiver 930 can also receive a common vocabulary. The automatic speech recognizer (ASR) 932 can generate the word sequence hypothesis based on the voiced audio and the dynamic vocabulary. In some examples, the ASR 932 can be communicatively coupled to a language model. For example, the language model can be trained using the dynamic vocabulary and updated with a parameter value from the application. In some examples, the ASR 932 can be communicatively coupled to a semantic model. For example, the semantic model can be trained using the dynamic vocabulary and updated with a parameter value from the application. The NLU 934 can detect an intent and recognize a property related to the intent based on the word sequence hypothesis and the dynamic vocabulary. In some examples, the NLU 934 can detect the intent and recognize the property based on the word sequence hypothesis, the dynamic vocabulary, and the common vocabulary. In some examples, the NLU 934 can include a feature front-end to generate a bag of features based on the word sequence hypothesis and the dynamic vocabulary. For example, the NLU can detect the intent and the property based on the bag of features. In some examples, the NLU 934 can include a trained neural network to detect the intent based on a bag of features generated from the word sequence hypothesis. In some examples, the NLU 934 can include a feature front-end to generate a set of continuous features based on a received common vocabulary and a set of discrete features based on the dynamic vocabulary. For example, the feature front-end can generate a bag of features to be used to recognize the property. In some examples, the NLU 934 can include a type caster to generate a canonical representation based on one or more words in the word sequence hypothesis with semantic tags. The transmitter 936 can transmit the detected intent and recognized associated property to an application.

The computing device 900 may also include a model trainer 938. The model trainer 938 can receive training data. The model trainer 938 can randomly sample the training data to generate a common training data and a representative dynamic training data. The model trainer 938 can calculate a common vocabulary based on the common training data and a dynamic vocabulary based on the representative dynamic training data. The model trainer 938 can train a model based on the common training data, the representative dynamic training data, the common vocabulary, the dynamic vocabulary, or any combination thereof. For example, the model trainer 938 can train the models using the method 800 described above. For example, the trainer 938 may be used to train the models 946 below.

The storage device 920 may include applications 940, a common vocabulary 942, a dynamic vocabulary 944, and one or more models 946. For example, the applications 940 may include a music player application, a climate control application, a mapping application, or any other application that may use dynamic vocabulary. In some examples, the common vocabulary 942 may include a list of static words. For example, the list of words in the common vocabulary 942 and have been received by receiver 930, as described above. The dynamic vocabulary 944 may include named entities and entity types and may be based on user data from the application 940 received at receiver 930. The models 946 may include a language model, a semantic model, an intent detection model, or a property recognition model. For example, the models 946 may have been estimated or trained using the model trainer 938.

The block diagram of FIG. 9 is not intended to indicate that the computing device 900 is to include all of the components shown in FIG. 9. Rather, the computing device 900 can include fewer or additional components not illustrated in FIG. 9, such as additional buffers, additional processors, and the like. The computing device 900 may include any number of additional components not shown in FIG. 9, depending on the details of the specific implementation. Furthermore, any of the functionalities of the receiver 930, the automatic speech recognizer 932, the NLU 934, the transmitter 936, the model trainer 938, and the application 940, may be partially, or entirely, implemented in hardware and/or in the processor 902. For example, the functionality may be implemented with an application specific integrated circuit, in logic implemented in the processor 902, or in any other device. In addition, any of the functionalities of the CPU 902 may be partially, or entirely, implemented in hardware and/or in a processor. For example, the functionality of the SLU 928 or the model trainer 938 may be implemented with an application specific integrated circuit, in logic implemented in a processor, in logic implemented in a specialized audio processing unit, or in any other device.

Figure 10:
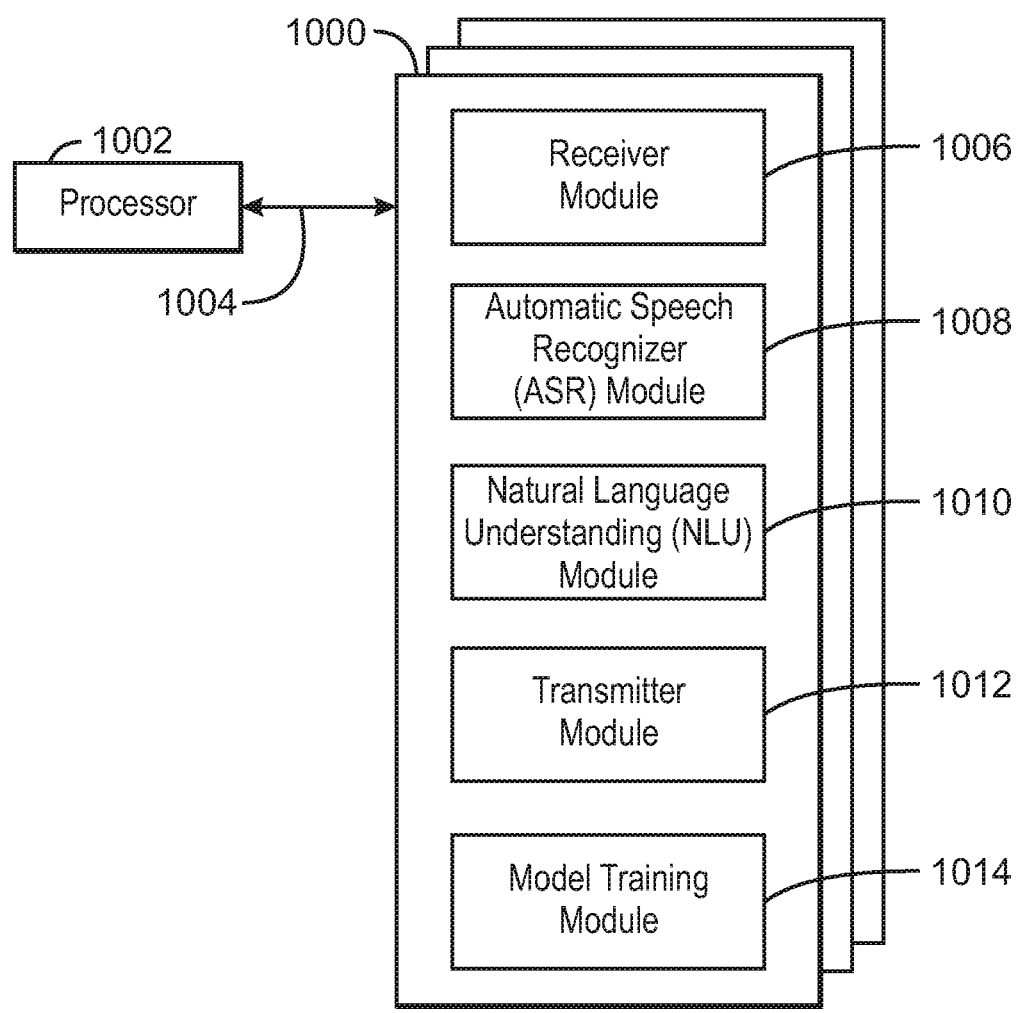
FIG. 10 is a block diagram showing computer readable media that store code for detecting intent in voiced audio using a dynamic vocabulary.

FIG. 10 is a block diagram showing computer readable media 1000 that store code for spoken language understanding using a dynamic vocabulary. The computer readable media 1000 may be accessed by a processor 1002 over a computer bus 1004. Furthermore, the computer readable medium 1000 may include code configured to direct the processor 1002 to perform the methods described herein. In some embodiments, the computer readable media 1000 may be non-transitory computer readable media. In some examples, the computer readable media 1000 may be storage media.

The various software components discussed herein may be stored on one or more computer readable media 1000, as indicated in FIG. 10. For example, a receiver module 1006 may be configured to receive a word sequence hypothesis related to a voiced audio and a dynamic vocabulary. In some examples, the receiver module 1006 may be configured to receive user data from the application and generate the dynamic vocabulary based on the user data. For example, the user data may include favorite artists, song titles, restaurants, places, etc. An automatic speech recognizer module 1008 may be configured to generate the word sequence based on the received voiced audio and the dynamic vocabulary. A natural language understanding (NLU) module 1010 may be configured to detect an intent based on the word sequence hypothesis and the dynamic vocabulary. For example, the NLU module 1010 may be configured to generate a bag of features based on the dynamic vocabulary and a received common vocabulary. In some examples, the NLU module 1010 may be configured to process a bag of features using a model trained using representative dynamic training data. In some examples, the NLU module 1010 may be configured to recognize a property related to the intent based on the word sequence hypothesis and the dynamic vocabulary. For example, the NLU module 1010 may be configured to generate a set of continuous features based on a received common vocabulary. The NLU module 1010 may also be configured to generate a set of discrete features based on the dynamic vocabulary. The module NLU 1010 may also be configured to generate a bag of features to be used to recognize the property based on the set of continuous features and the set of discrete features. In some examples, the NLU module 1010 may be configured to semantically tag words in the word sequence hypothesis based on a generated bag of features. In some examples, the NLU module 1010 may be configured to detect longer dynamic vocabulary before shorter dynamic vocabulary. In some examples, the NLU module 1010 may be configured to generate a canonical representation based on one or more words in the word sequence hypothesis with semantic tags. A transmitter module 1012 may be configured to transmit the detected intent and recognized associated property to an application. A model training module 1014 may be configured to train a model used to detect intent or recognize properties. For example, the model training module 1014 may be configured to receive training data. The model training module 1014 may also be configured to randomly sample the training data to generate common training data and representative dynamic training data. The model training module 1014 may also be configured to calculate a common vocabulary based on the common training data and the dynamic vocabulary based on the representative dynamic training data. The model training module 1014 may also be configured to train the model based on the common training data, the representative dynamic training data, the common vocabulary, and the dynamic vocabulary.

The block diagram of FIG. 10 is not intended to indicate that the computer readable media 1000 is to include all of the components shown in FIG. 10. Further, the computer readable media 1000 may include any number of additional components not shown in FIG. 10, depending on the details of the specific implementation.

EXAMPLES

Example 1 is an apparatus for detecting intent in voice audio. The apparatus includes a receiver to receive a word sequence hypothesis related to a voiced audio and a dynamic vocabulary. The apparatus also includes a natural language understander (NLU) to detect an intent and recognize a property related to the intent based on the word sequence hypothesis and the dynamic vocabulary. The apparatus further includes a transmitter to transmit the detected intent and recognized associated property to an application.

Example 2 includes the apparatus of example 1, including or excluding optional features. In this example, the NLU includes a feature front-end to generate a bag of features based on the word sequence hypothesis and the dynamic vocabulary. The NLU is to detect the intent and the property based on the bag of features.

Example 3 includes the apparatus of any one of examples 1 to 2, including or excluding optional features. In this example, the NLU includes a trained neural network to detect the intent based on a bag of features generated from the word sequence hypothesis.

Example 4 includes the apparatus of any one of examples 1 to 3, including or excluding optional features. In this example, the NLU includes a feature front-end to generate a set of continuous features based on a received common vocabulary and a set of discrete features based on the dynamic vocabulary, and generate a bag of features to be used to recognize the property.

Example 5 includes the apparatus of any one of examples 1 to 4, including or excluding optional features. In this example, the NLU includes a type caster to generate a canonical representation based on one or more words in the word sequence hypothesis with semantic tags.

Example 6 includes the apparatus of any one of examples 1 to 5, including or excluding optional features. In this example, the apparatus includes an automatic speech recognizer (ASR) to receive voiced audio and generate the word sequence hypothesis based on the dynamic vocabulary.

Example 7 includes the apparatus of any one of examples 1 to 6, including or excluding optional features. In this example, the dynamic vocabulary is generated based on user data received from the application.

Example 8 includes the apparatus of any one of examples 1 to 7, including or excluding optional features. In this example, the apparatus includes a language model communicatively coupled to an automated speech recognizer. The language model is trained using representative dynamic training data and updated with a parameter value from the application.

Example 9 includes the apparatus of any one of examples 1 to 8, including or excluding optional features. In this example, the apparatus includes a semantic model communicatively coupled to the NLU. The semantic model is trained using the dynamic vocabulary and updated with a parameter value from the application.

Example 10 includes the apparatus of any one of examples 1 to 9, including or excluding optional features. In this example, the receiver is to also receive a common vocabulary. The NLU is to detect the intent and recognize the property based on the word sequence hypothesis, the dynamic vocabulary, and the common vocabulary.

Example 11 is a method for detecting intent in voiced audio. The method includes receiving, via a processor, a word sequence hypothesis related to a voiced audio and a dynamic vocabulary. The method also includes detecting, via the processor, an intent based on the word sequence hypothesis and the dynamic vocabulary. The method further includes recognizing, via the processor, a property related to the intent based on the word sequence hypothesis and the dynamic vocabulary. The method also further includes sending, via the processor, the detected intent and recognized property to an application.

Example 12 includes the method of example 11, including or excluding optional features. In this example, detecting the intent includes generating a bag of features based on the dynamic vocabulary and a received common vocabulary.

Example 13 includes the method of any one of examples 11 to 12, including or excluding optional features. In this example, detecting the intent includes processing a bag of features using a model trained using representative dynamic training data.

Example 14 includes the method of any one of examples 11 to 13, including or excluding optional features. In this example, recognizing the property includes generating a set of continuous features based on a received common vocabulary, generating a set of discrete features based on the dynamic vocabulary, and generating a bag of features to be used to recognize the property.

Example 15 includes the method of any one of examples 11 to 14, including or excluding optional features. In this example, recognizing the property includes semantically tagging a word in the word sequence hypothesis based on a generated bag of features.

Example 16 includes the method of any one of examples 11 to 15, including or excluding optional features. In this example, the method includes generating the word sequence hypothesis based on the voiced audio and the dynamic vocabulary.

Example 17 includes the method of any one of examples 11 to 16, including or excluding optional features. In this example, the method includes generating a canonical representation based on one or more words in the word sequence hypothesis with semantic tags.

Example 18 includes the method of any one of examples 11 to 17, including or excluding optional features. In this example, the method includes training a model to detect the intent. Training the model includes receiving, via the processor, training data. Training the model also includes randomly sampling, via the processor, the training data to generate common training data and representative dynamic training data. Training the model further includes calculating, via the processor, a common vocabulary based on the common training data and the dynamic vocabulary based on the representative dynamic training data. Training the model also further includes training, via the processor, the model based on the common training data, the representative dynamic training data, the common vocabulary, and the dynamic vocabulary.

Example 19 includes the method of any one of examples 11 to 18, including or excluding optional features. In this example, detecting the intent and recognizing the property includes detecting longer dynamic vocabulary before shorter dynamic vocabulary.

Example 20 includes the method of any one of examples 11 to 19, including or excluding optional features. In this example, the method includes receiving, via the processor, user data from the application and generating the dynamic vocabulary based on the user data.

Example 21 is at least one computer readable medium for detecting intent in voiced audio having instructions stored therein that direct the processor to receive a word sequence hypothesis related to a voiced audio and a dynamic vocabulary. The computer-readable medium also includes instructions that direct the processor to detect an intent based on the word sequence hypothesis and the dynamic vocabulary. The computer-readable medium further includes instructions that direct the processor to recognize a property related to the intent based on the word sequence hypothesis and the dynamic vocabulary. The computer-readable medium also further includes instructions that direct the processor to transmit the detected intent and recognized associated property to an application.

Example 22 includes the computer-readable medium of example 21, including or excluding optional features. In this example, the computer-readable medium includes instructions to generate a bag of features based on the dynamic vocabulary and a received common vocabulary.

Example 23 includes the computer-readable medium of any one of examples 21 to 22, including or excluding optional features. In this example, the computer-readable medium includes instructions to process a bag of features using a model trained using representative dynamic training data.

Example 24 includes the computer-readable medium of any one of examples 21 to 23, including or excluding optional features. In this example, the computer-readable medium includes instructions to generate a set of continuous features based on a received common vocabulary. The computer-readable medium also includes instructions to generate a set of discrete features based on the dynamic vocabulary. The computer-readable medium further includes instructions to generate a bag of features to be used to recognize the property based on the set of continuous features and the set of discrete features.

Example 25 includes the computer-readable medium of any one of examples 21 to 24, including or excluding optional features. In this example, the computer-readable medium includes instructions to receive user data from the application and generate the dynamic vocabulary based on the user data.

Example 26 includes the computer-readable medium of any one of examples 21 to 25, including or excluding optional features. In this example, the computer-readable medium includes instructions to semantically tag a word in the word sequence hypothesis based on a generated bag of features.

Example 27 includes the computer-readable medium of any one of examples 21 to 26, including or excluding optional features. In this example, the computer-readable medium includes instructions to generate the word sequence hypothesis based on the voiced audio and the dynamic vocabulary.

Example 28 includes the computer-readable medium of any one of examples 21 to 27, including or excluding optional features. In this example, the computer-readable medium includes instructions to generate a canonical representation based on one or more words in the word sequence hypothesis with semantic tags.

Example 29 includes the computer-readable medium of any one of examples 21 to 28, including or excluding optional features. In this example, the computer-readable medium includes instructions to receive training data. The computer-readable medium also includes instructions to randomly sample the training data to generate common training data and representative dynamic training data. The computer-readable medium further includes instructions to calculate a common vocabulary based on the common training data and the dynamic vocabulary based on the representative dynamic training data. The computer-readable medium also further includes instructions to train a model used to detect the intent based on the common training data, the representative dynamic training data, the common vocabulary, and the dynamic vocabulary.

Example 30 includes the computer-readable medium of any one of examples 21 to 29, including or excluding optional features. In this example, the computer-readable medium includes instructions to detect longer dynamic vocabulary before shorter dynamic vocabulary.

Example 31 is a system for detecting intent in voice audio. The system includes a receiver to receive a word sequence hypothesis related to a voiced audio and a dynamic vocabulary. The system also includes a natural language understander (NLU) to detect an intent and recognize a property related to the intent based on the word sequence hypothesis and the dynamic vocabulary. The system further includes and a transmitter to transmit the detected intent and recognized associated property to an application.

Example 32 includes the system of example 31, including or excluding optional features. In this example, the NLU includes a feature front-end to generate a bag of features based on the word sequence hypothesis and the dynamic vocabulary, wherein the NLU is to detect the intent and the property based on the bag of features.

Example 33 includes the system of any one of examples 31 to 32, including or excluding optional features. In this example, the NLU includes a trained neural network to detect the intent based on a bag of features generated from the word sequence hypothesis.

Example 34 includes the system of any one of examples 31 to 33, including or excluding optional features. In this example, the NLU includes a feature front-end to generate a set of continuous features based on a received common vocabulary and a set of discrete features based on the dynamic vocabulary, and generate a bag of features to be used to recognize the property.

Example 35 includes the system of any one of examples 31 to 34, including or excluding optional features. In this example, the NLU includes a type caster to generate a canonical representation based on one or more words in the word sequence hypothesis with semantic tags.

Example 36 includes the system of any one of examples 31 to 35, including or excluding optional features. In this example, the system includes an automatic speech recognizer (ASR) to receive voiced audio and generate the word sequence hypothesis based on the dynamic vocabulary.

Example 37 includes the system of any one of examples 31 to 36, including or excluding optional features. In this example, the dynamic vocabulary is generated based on user data received from the application.

Example 38 includes the system of any one of examples 31 to 37, including or excluding optional features. In this example, the system includes a language model communicatively coupled to an automated speech recognizer. The language model is trained using representative dynamic training data and updated with a parameter value from the application.

Example 39 includes the system of any one of examples 31 to 38, including or excluding optional features. In this example, the system includes a semantic model communicatively coupled to the NLU. The semantic model is trained using the dynamic vocabulary and updated with a parameter value from the application.

Example 40 includes the system of any one of examples 31 to 39, including or excluding optional features. In this example, the receiver is to also receive a common vocabulary, the NLU to detect the intent and recognize the property based on the word sequence hypothesis, the dynamic vocabulary, and the common vocabulary.

Example 41 is a system for detecting intent in voice audio. The system includes means for receiving a word sequence hypothesis related to a voiced audio and a dynamic vocabulary. The system also includes means for detecting an intent and recognize a property related to the intent based on the word sequence hypothesis and the dynamic vocabulary. The system further includes and means for transmitting the detected intent and recognized associated property to an application.

Example 42 includes the system of example 41, including or excluding optional features. In this example, the means for detecting the intent and recognizing the property includes a feature front-end to generate a bag of features based on the word sequence hypothesis and the dynamic vocabulary. The means for detecting the intent and recognizing the property is to detect the intent and the property based on the bag of features.

Example 43 includes the system of any one of examples 41 to 42, including or excluding optional features. In this example, the means for detecting the intent and recognizing the property includes a trained neural network to detect the intent based on a bag of features generated from the word sequence hypothesis.

Example 44 includes the system of any one of examples 41 to 43, including or excluding optional features. In this example, the means for detecting the intent and recognizing the property includes a feature front-end to generate a set of continuous features based on a received common vocabulary and a set of discrete features based on the dynamic vocabulary, and generate a bag of features to be used to recognize the property.

Example 45 includes the system of any one of examples 41 to 44, including or excluding optional features. In this example, the means for detecting the intent and recognizing the property includes a type caster to generate a canonical representation based on one or more words in the word sequence hypothesis with semantic tags.

Example 46 includes the system of any one of examples 41 to 45, including or excluding optional features. In this example, the system includes means for receiving voiced audio and generate the word sequence hypothesis based on the dynamic vocabulary.

Example 47 includes the system of any one of examples 41 to 46, including or excluding optional features. In this example, the dynamic vocabulary is generated based on user data received from the application.

Example 48 includes the system of any one of examples 41 to 47, including or excluding optional features. In this example, the system includes a language model communicatively coupled to an automated speech recognizer. The language model is trained using representative dynamic training data and updated with a parameter value from the application.

Example 49 includes the system of any one of examples 41 to 48, including or excluding optional features. In this example, the system includes a semantic model communicatively coupled to the means for detecting the intent and recognizing the property. The semantic model is trained using the dynamic vocabulary and updated with a parameter value from the application.

Example 50 includes the system of any one of examples 41 to 49, including or excluding optional features. In this example, the means for receiving the word sequence hypothesis is to also receive a common vocabulary. The means for detecting the intent and recognizing the property is to detect the intent and recognize the property based on the word sequence hypothesis, the dynamic vocabulary, and the common vocabulary.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for detecting intent in voice audio, the apparatus comprising:

a receiver to receive a common vocabulary including a list of static words and a parameter value from an application, the parameter value including a dynamic word to be added to a dynamic vocabulary including a set of relations between word sequences and semantic classes and a list of parameters that are to be used to detect dynamic vocabulary phrases;

an automatic speech recognizer (ASR) to receive voiced audio and generate a word sequence hypothesis based on a language model including word probabilities derived from the dynamic vocabulary based on the semantic classes;

a natural language understander (NLU) including:

a feature front-end to generate a bag of features vector including a first sub vector including bag of words feature vector of distinguishing words derived from the common vocabulary based on weighted word counts in the word sequence hypothesis and a second sub vector including a feature vector of dynamic vocabulary detected in the word sequence hypothesis;

an intent detector to detect an intent based on the bag of features vector;

a property recognizer to compute a semantic tag for each word in the word sequence hypothesis based on the bag of features; and a transmitter to transmit the detected intent and a canonical representation generated based on the semantic tags to the application.

2. The apparatus of claim 1, wherein the NLU includes a trained neural network to detect the intent based on the bag of features generated from the word sequence hypothesis.

3. The apparatus of claim 1, wherein the feature front-end is to generate a set of continuous features based on a received common vocabulary and a set of discrete features based on the dynamic vocabulary, and generate the bag of features to be used to compute the semantic tags.

4. The apparatus of claim 1, wherein the NLU includes a type caster to generate the canonical representation based on one or more words in the word sequence hypothesis with the semantic tags.

5. The apparatus of claim 1, wherein the dynamic vocabulary is generated based on user data received from the application.

6. The apparatus of claim 1, wherein the language model is trained using representative dynamic training data and updated with the parameter value from the application.

7. The apparatus of claim 1, further including a semantic model communicatively coupled to the NLU, wherein the semantic model is trained using the dynamic vocabulary and updated with the parameter value from the application.

8. The apparatus of claim 1, wherein the NLU includes a classifier trained to generate the intent based on the bag of features vector using a model trained by considering a subset of representative training data as dynamic.

9. The apparatus of claim 1, wherein the property recognizer includes a model including a condition random field, a hidden Markov model or a recurrent neuronal network trained considering a sub-set of training data vocabulary as being dynamic.

10. The apparatus of claim 1, wherein the intent detector includes a trained recurrent neural network or deep neural network trained considering a sub-set of training data vocabulary as being dynamic.

11. A method for detecting intent in voiced audio, the method comprising:

receiving, via a processor, a common vocabulary including a list of static words and a parameter value from an application, the parameter value including a dynamic word to be added to a dynamic vocabulary including a set of relations between word sequences and semantic classes and a list of parameters used to detect dynamic vocabulary phrases;

receiving, via the processor, voiced audio and generating a word sequence hypothesis based on a language model including word probabilities derived from the dynamic vocabulary based on the semantic classes;

generating, via the processor, a bag of features vector including a first sub vector including bag of words feature vector of distinguishing words derived from the common vocabulary based on weighted word counts in the word sequence hypothesis and a second sub vector including a feature vector of dynamic vocabulary detected in the word sequence hypothesis;

detecting, via the processor, an intent based on the bag of features vector;

computing, via the processor, a semantic tag for each word in the word sequence hypothesis based on the bag of features; and sending, via the processor, the detected intent and a canonical representation generated based on the semantic tags to the application.

12. The method of claim 11, wherein detecting the intent includes processing the bag of features using a model trained using representative dynamic training data.

13. The method of claim 11, wherein generating the bag of features includes generating a set of continuous features based on the received common vocabulary, generating a set of discrete features based on the dynamic vocabulary, and generating the bag of features to be used to compute the semantic tags.

14. The method of claim 11, wherein computing the semantic tags includes semantically tagging a word in the word sequence hypothesis based on a generated bag of features.

15. The method of claim 11, further including generating a canonical representation based on one or more words in the word sequence hypothesis with the semantic tags.

16. The method of claim 11, further including training a model to detect the intent, wherein training the model includes:
  receiving, via the processor, training data;
  randomly sampling, via the processor, the training data to generate common training data and representative dynamic training data;
  calculating, via the processor, the common vocabulary based on the common training data and the dynamic vocabulary based on the representative dynamic training data; and
  training, via the processor, the model based on the common training data, the representative dynamic training data, the common vocabulary, and the dynamic vocabulary.

17. The method of claim 11, wherein detecting the intent and computing the semantic tags includes detecting a longer dynamic vocabulary before a shorter dynamic vocabulary.

18. The method of claim 11, further including:
  receiving, via the processor, user data from the application: and
  generating the dynamic vocabulary based on the user data.

19. At least one non-transitory computer readable medium for detecting intent in voiced audio comprising instructions stored therein that, in response to being executed on a computing device, cause the computing device to at least:
  receive a common vocabulary including a list of static words and a parameter value from an application, the parameter value including a dynamic word to be added to a dynamic vocabulary including a set of relations between word sequences and semantic classes and a list of parameters that are to be used to detect dynamic vocabulary phrases;
  receive voiced audio and generating a word sequence hypothesis based on a language model including word probabilities derived from the dynamic vocabulary based on the semantic classes;
  generate a bag of features vector including a first sub vector including bag of words feature vector of distinguishing words derived from the common vocabulary based on weighted word counts in the word sequence hypothesis and a second sub vector including a feature vector of dynamic vocabulary detected in the word sequence hypothesis;
  detect an intent based on the bag of features vector;
  compute a semantic tag for each word in the word sequence hypothesis based on the bag of features; and
  transmit the detected intent and a canonical representation generated based on the semantic tags to the application.

20. The at least one non-transitory computer readable medium of claim 19, wherein the instructions cause the computing device to process the bag of features using a model trained using representative dynamic training data.

21. The at least one non-transitory computer readable medium of claim 19, wherein the instructions cause the computing device instructions to:
  generate a set of continuous features based on a received common vocabulary;
  generate a set of discrete features based on the dynamic vocabulary; and
  generate the bag of features to be used to compute the semantic tags based on the set of continuous features and the set of discrete features.

22. The at least one non-transitory computer readable medium of claim 19, wherein the instructions cause the computing device to receive user data from the application and generate the dynamic vocabulary based on the user data.

* * * * *